US005797504A

United States Patent [19]

Mangum

[11] Patent Number: 5,797,504

[45] Date of Patent: Aug. 25, 1998

[54] PORTABLE HOISTING SYSTEM

[76] Inventor: Burney Mangum, 182 Daytona Dr., San Antonio, Tex. 78227

[21] Appl. No.: 876,861

[22] Filed: Jun. 16, 1997

[51] Int. Cl.$^6$ .......... B60P 1/14

[52] U.S. Cl. .......... 212/303; 212/202; 212/204; 212/901; 254/4 R

[58] Field of Search .......... 212/202, 204, 212/301, 302, 303, 901, 180; 254/4 R, 4 B, 4 C

[56] References Cited

U.S. PATENT DOCUMENTS

| | | | |
|---|---|---|---|
| 694,866 | 3/1902 | Kaschewitz et al. | 212/204 |
| 784,586 | 3/1905 | McGahey | 212/204 |
| 1,174,290 | 3/1916 | Ruland . | |
| 1,435,065 | 11/1922 | Holmes | 212/901 |
| 1,502,989 | 7/1924 | Heffron . | |
| 1,699,587 | 1/1929 | Grenier | 212/294 |
| 2,023,790 | 12/1935 | Ormsby et al. | 212/901 |
| 2,634,875 | 4/1953 | Trautner | 254/4 R |
| 2,804,979 | 9/1957 | Lassiter | 212/202 |
| 3,181,707 | 5/1965 | Janssen | 212/204 |
| 3,266,598 | 8/1966 | Henne | 187/2 |
| 3,948,482 | 4/1976 | Brophy | 254/4 R |
| 4,068,827 | 1/1978 | Fanning et al. | 254/139.1 |
| 4,597,498 | 7/1986 | Spinosa et al. | 212/901 |
| 4,600,348 | 7/1986 | Pettit | 254/4 C |
| 4,782,962 | 11/1988 | Hackworth et al. | 212/195 |
| 5,597,081 | 1/1997 | Shirley | 212/299 |

*Primary Examiner*—Thomas J. Brahan
*Attorney, Agent, or Firm*—Joseph N. Breaux

[57] ABSTRACT

A hoisting system for lifting construction items at a construction site that includes a base assembly, a telescoping pole assembly carried on the base assembly, a slidably positionable line guide assembly slidably mounted to the telescoping pole assembly, a hoisting line assembly having a hoisting line threaded through a guiding aperture of the line guide assembly, and a ratcheting winch assembly mounted onto the telescoping pole assembly and including a take up reel upon which a length of the hoisting line is wound.

1 Claim, 3 Drawing Sheets

PORTABLE HOISTING SYSTEM

TECHNICAL FIELD

The present invention relates to mechanical hoisting devices and more particularly to a portable hoisting system that includes a base assembly, a telescoping pole assembly carried on the base assembly, a slidably positionable line guide assembly slidably mounted to the telescoping pole assembly, a hoisting line assembly having a hoisting line threaded through a guiding aperture of the line guide assembly, and a ratcheting winch assembly mounted onto the telescoping pole assembly and including a take up reel upon which a length of the hoisting line is wound; the base assembly including a base plate, four radiating legs extending from the base plate, and four swivel mounted rollers mounted to an underside surface of the base plate, each radiating leg including a user adjustable leveling support; the telescoping pole assembly including a lower pole rigidly mounted to an upper side surface of the base plate and an upper pole telescopically positionable with respect to the lower pole, the upper pole being lockable in a fixed position with respect to the lower pole with at least one pole locking pin assembly; the slidably positionable line guide assembly including a tubular slide portion slidably positionable over the end of the upper pole, a U-shaped pulley housing rigidly secured to the tubular slide portion, a line guide including a pulley rotatably mounted within the U-shaped pulley housing, and at least one line guide locking pin, the tubular slide portion having a rear assembly locking pin hole and a forward assembly locking pin hole formed through the sidewalls thereof, the line guide locking pin being sized in a manner to be insertable through the rear assembly locking pin hole, the forward assembly locking pin hole and a pair of the number of concentrically aligned forward and rear pole locking pin holes; the ratcheting winch assembly including an elongated handle section attached to the take up reel and of a length sufficient to extend past the side edge of the lower pole of the telescoping pole assembly.

BACKGROUND OF THE INVENTION

It is often necessary to hoist construction items, such as trusses or the like, to an elevated position during the construction of a building. Although this hoisting task is often accomplished by coordinating many workers pulling on a hoisting line, it would be a benefit to have a hoisting system that could be used by as few as one worker at a construction site to hoist a construction item, such as a roof truss, into an elevated position. Because it is often necessary to move the construction item into a specific position and then to hold the construction item in that position while the construction item is installed by workers, it would of course be a benefit to have a hoisting system that can be moved while the construction item is being support at an elevated height. In addition, because the hoisting system can be expensive, it would be a benefit to have a hoisting system that could easily be transported between a number of construction sites in a readily available vehicle such as a pickup truck in order to spread the cost of the hoisting system over a larger number of construction jobs.

SUMMARY OF THE INVENTION

It is thus an object of the invention to provide a portable hoisting system that is operable by as few as one worker at a construction site to hoist a construction item, such as a roof truss, into an elevated position.

It is a further object of the invention to provide a portable hoisting system that is moveable while a construction item is being support at an elevated height.

It is a still further object of the invention to provide a portable hoisting system that is transportable in the bed of a pickup truck.

It is a still further object of the invention to provide a portable hoisting system that includes a base assembly, a telescoping pole assembly carried on the base assembly, a slidably positionable line guide assembly slidably mounted to the telescoping pole assembly, a hoisting line assembly having a hoisting line threaded through a guiding aperture of the line guide assembly, and a ratcheting winch assembly mounted onto the telescoping pole assembly and including a take up reel upon which a length of the hoisting line is wound; the base assembly including a base plate, four radiating legs extending from the base plate, and four swivel mounted rollers mounted to an underside surface of the base plate, each radiating leg including a user adjustable leveling support; the telescoping pole assembly including a lower pole rigidly mounted to an upper side surface of the base plate and an upper pole telescopically positionable with respect to the lower pole, the upper pole being lockable in a fixed position with respect to the lower pole with at least one pole locking pin assembly; the slidably positionable line guide assembly including a tubular slide portion slidably positionable over the end of the upper pole, a U-shaped pulley housing rigidly secured to the tubular slide portion, a line guide including a pulley rotatably mounted within the U-shaped pulley housing, and at least one line guide locking pin, the tubular slide portion having a rear assembly locking pin hole and a forward assembly locking pin hole formed through the sidewalls thereof, the line guide locking pin being sized in a manner to be insertable through the rear assembly locking pin hole, the forward assembly locking pin hole and a pair of the number of concentrically aligned forward and rear pole locking pin holes; the ratcheting winch assembly including an elongated handle section attached to the take up reel and of a length sufficient to extend past the side edge of the lower pole of the telescoping pole assembly.

It is a still further object of the invention to provide a portable hoisting system that accomplishes some or all of the above objects in combination.

Accordingly, a portable hoisting system is provided. The portable hoisting system includes a base assembly, a telescoping pole assembly carried on the base assembly, a slidably positionable line guide assembly slidably mounted to the telescoping pole assembly, a hoisting line assembly having a hoisting line threaded through a guiding aperture of the line guide assembly, and a ratcheting winch assembly mounted onto the telescoping pole assembly and including a take up reel upon which a length of the hoisting line is wound; the base assembly including a base plate, four radiating legs extending from the base plate, and four swivel mounted rollers mounted to an underside surface of the base plate, each radiating leg including a user adjustable leveling support; the telescoping pole assembly including a lower pole rigidly mounted to an upper side surface of the base plate and an upper pole telescopically positionable with respect to the lower pole, the upper pole being lockable in a fixed position with respect to the lower pole with at least one pole locking pin assembly; the slidably positionable line guide assembly including a tubular slide portion slidably positionable over the end of the upper pole, a U-shaped pulley housing rigidly secured to the tubular slide portion, a line guide including a pulley rotatably mounted within the U-shaped pulley housing, and at least one line guide locking pin, the tubular slide portion having a rear assembly locking pin hole and a forward assembly locking pin hole formed through the sidewalls thereof, the line guide locking pin being sized in a manner to be insertable through the rear assembly locking pin hole, the forward assembly locking pin hole and a pair of the number of concentrically aligned forward and rear pole locking pin holes; the ratcheting winch assembly including an elongated handle section attached to the take up reel and of a length sufficient to extend fast the side edge of the lower pole of the telescoping pole assembly.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
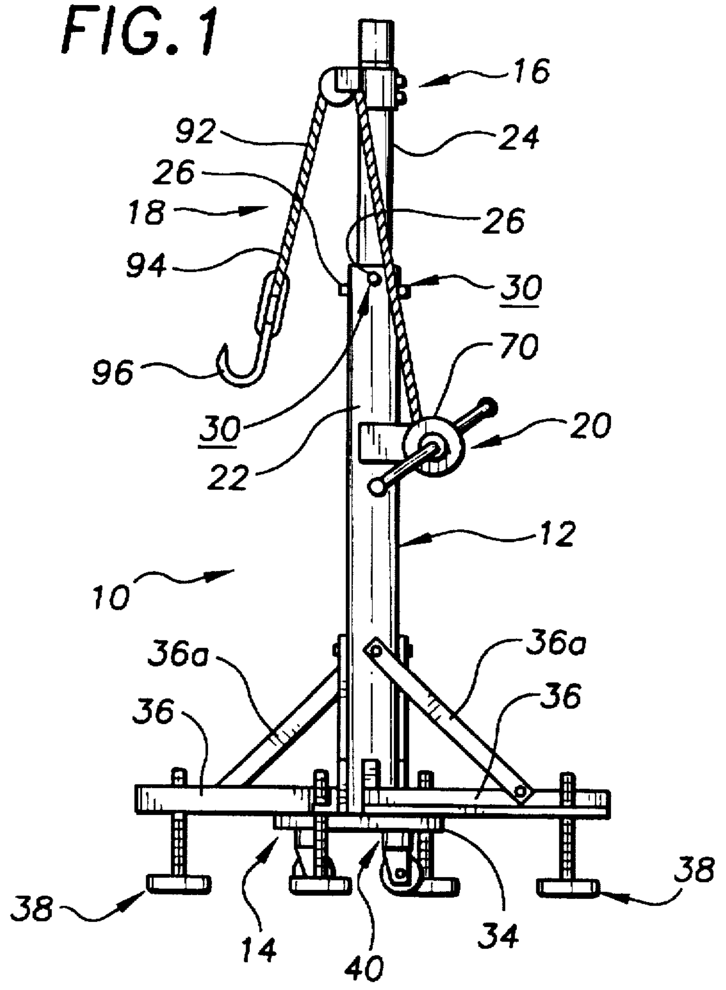
FIG. 1 is a side plan view of an exemplary embodiment of the portable hoisting system of the present invention showing the telescoping pole assembly including the lower pole and upper pole; the base assembly including the base plate, the four radiating legs, the four user adjustable leveling supports, and the four swivel mounted rollers; the slidably positionable line guide assembly; the hoisting line assembly with optional attachment hook; and the ratcheting winch assembly.

FIG. 1 shows an exemplary embodiment of the portable hoisting system of the present invention generally designated by the numeral 10. In this embodiment, portable hoisting system 10 includes a telescoping pole assembly, generally designated 12; a base assembly, generally designated 14; a slidably positionable line guide assembly, generally designated 16; a hoisting line assembly, generally designated 18; and a ratcheting winch assembly, generally designated 20. Telescoping pole assembly 12 includes a lower pole 22 and an upper pole 24. Lower pole 22 is a ten foot length of six inch diameter aluminum pipe. Upper pole 24 is a ten foot length of four inch diameter aluminum pipe that is slidable within lower pole 22. The position of upper pole 24 with respect to lower pole 22 can be fixed at a desired height by inserting pole position pins 26 through aligned pole positioning holes 30.

Figure 2:
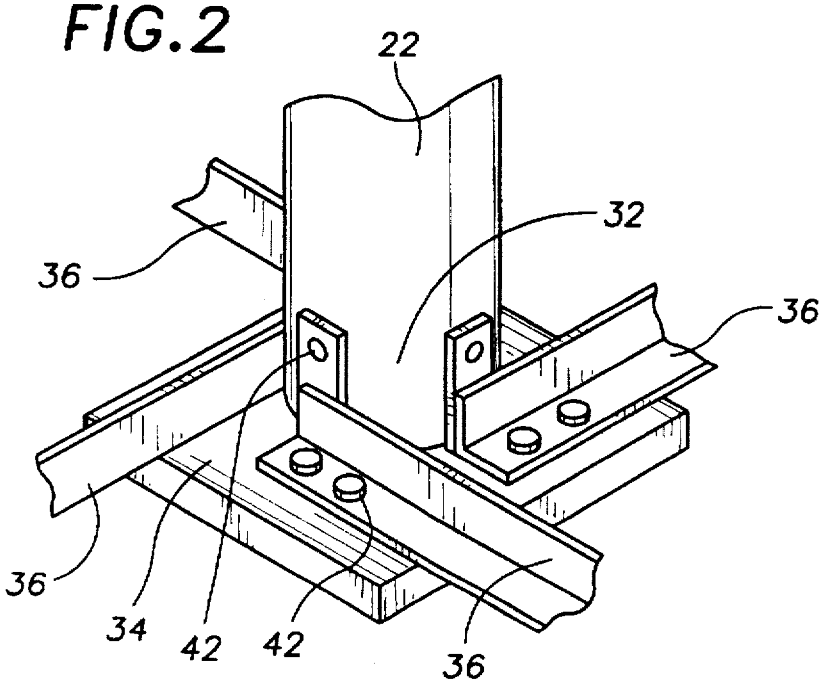
FIG. 2 is a detail perspective view showing the end of the lower pole of the telescoping pole assembly attached to the base plate of the base assembly with the four radiating legs riveted to the end of the lower pole and the base plate.
Figure 3:
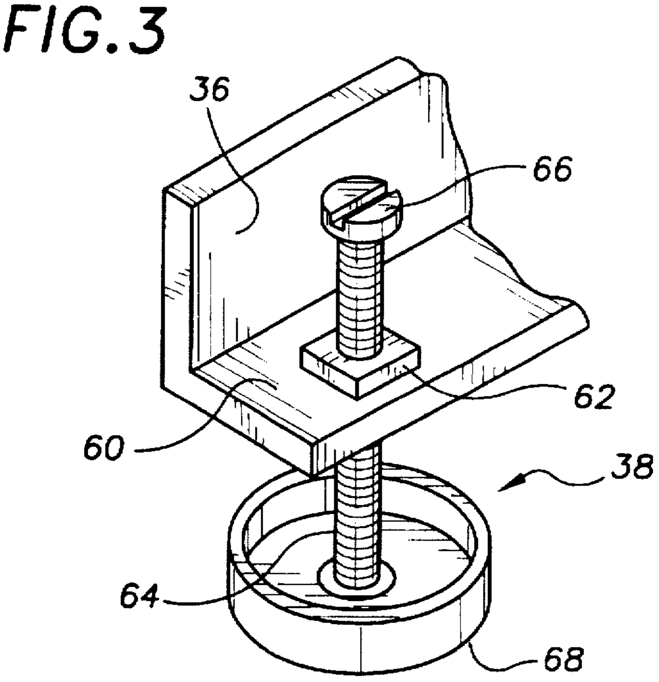
FIG. 3 is a detail perspective view of one of the four user adjustable leveling supports including the threaded height adjustment screw with the slotted screw head, the threaded adjustment screw aperture, and the swivel mounted support skid.
Figure 4:
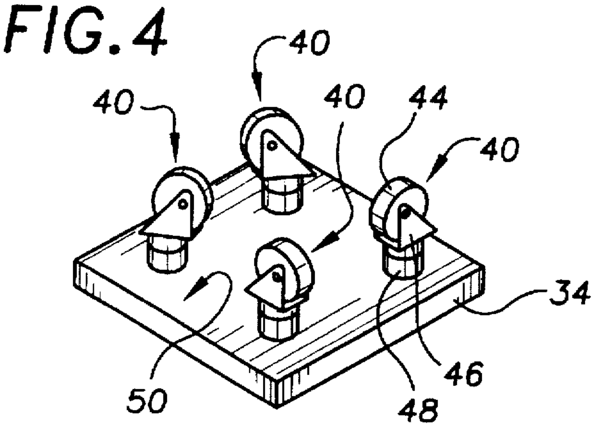
FIG. 4 is a perspective view showing the underside of the base plate of the base assembly with the four radiating legs removed showing the four swivel mounted rollers used to roll the portable hoisting system into position for use.

Base assembly 14 includes a rectangular steel base plate 34; four radiating legs 36 (also shown in FIG. 2) each with an angled leg brace **36*a*; four identical user adjustable leveling supports, generally designated 38 (also shown in FIG. 3; and four swivel mounted rollers 40 (also shown in FIG. 4). In this embodiment, base plate 34 is constructed from a two foot by two foot section of three-sixteenth inch thick plate steel. With reference to FIG. 2, each of the four radiating legs 36 is a four foot length of one-quarter inch thick, one and one-half inch by one and one-half inch angled steel stock. Each of the four radiating legs 36 includes an angled leg brace 36*a* (FIG. 1) secured between the radiating leg 36 and lower pole 22**.

In this embodiment, lower pole 22 and each of the four radiating legs 36 is secured to base plate 34 with bolts 42. Although bolts 42 are used in this embodiment, it should be understood that other conventional mechanisms for forming this attachment, such as welding, riveting etc., can also be used without departing from the spirit and scope of the invention taught herein.

With reference now to FIG. 3, each of the four radiating legs 36 has an one of the four adjustable leveling supports 38 installed at the far end 60 thereof. Each adjustable leveling support 38 includes a threaded nut 62, a threaded adjustment screw 64 having a slotted screw head 66, and a swivel connected support skid 68. Threaded nut 62 is welded to far end 60 of radiating leg 36 and positioned above and concentrically oriented with a support aperture (not shown) that has a diameter greater than the bore of threaded nut 62. During assembly, threaded adjustment screw 64 is threaded through threaded nut 62 and swivel secured to support skid 68. In this embodiment, support skid 68 is molded from a nonskid plastic.

Referring now to FIG. 4, each swivel mounted roller 40 includes a five inch diameter rubber wheel 44 rotatably mounted on a wheel mount 46. Each wheel mount 46 is swivel mounted to a three inch metal extension block 48. Each metal extension block 48 is welded to the underside surface 50 of steel base plate 34. Swivel mounted rollers 40 provide eight inches of clearance between the ground and underside surface 50 of base plate 34.

Figure 5:
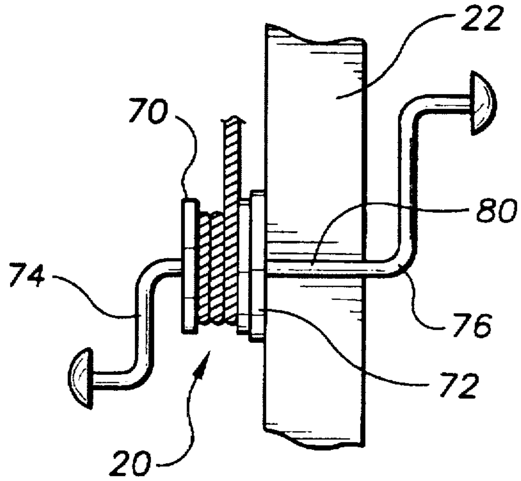
FIG. 5 is a side plan view of the ratcheting winch assembly showing the offset mounting and the elongated right handle section extending past the side of the lower pole of the telescoping pole assembly.

With reference to FIG. 5, in this embodiment ratcheting winch assembly 20 is of conventional construction and includes an internal ratchet mechanism, a take up reel 70, a mounting plate 72, and a handle assembly including a left handle section 74 and an elongated right handle section 76. In this embodiment, mounting plate 72 is bolted to lower pole 22. Elongated right handle section 76 includes an extension portion 80 having a length greater than the diameter of lower pole 22.

Figure 6:
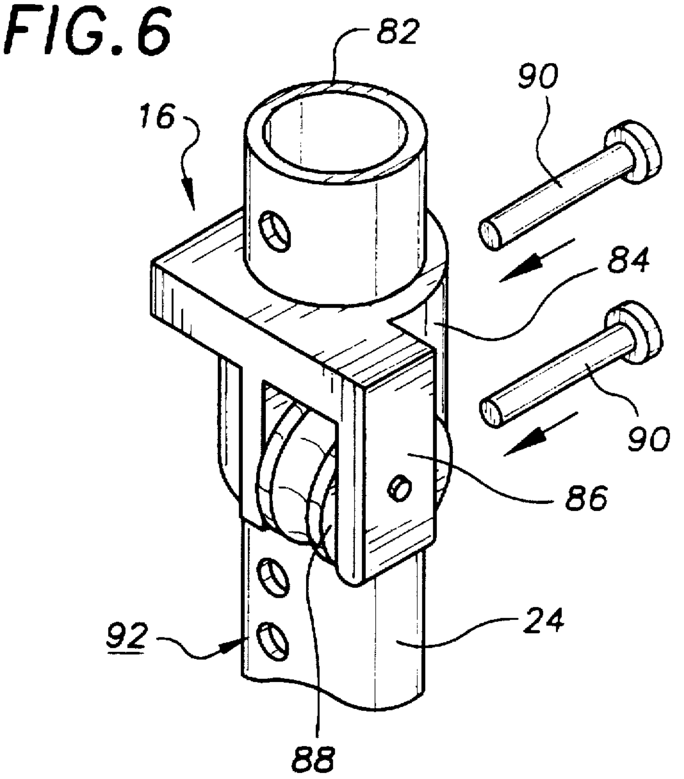
FIG. 6 is a partially exploded perspective view of the slidably positionable line guide assembly slidably positioned onto the top end of the upper pole and showing the tubular slide portion, the U-shaped pulley housing, the rotatably mounted pulley, and the two assembly locking pins; and a number of forward pole locking pin holes formed through the upper pole.
Figure 7:
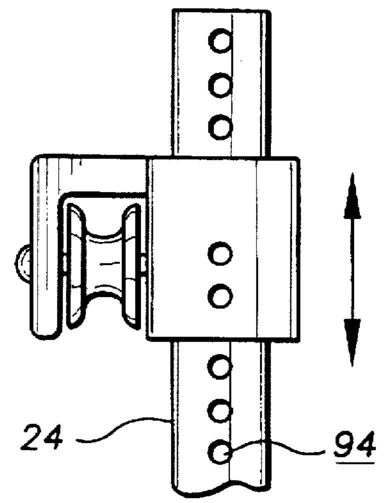
FIG. 7 is a rear side plan view of the slidably positionable line guide assembly slidably positioned onto the top end of the upper pole showing the rear pole locking pin holes formed through the upper pole; and the tubular slide portion, the U-shaped pulley housing, the rotatably mounted pulley, and the two rear assembly locking pin holes.
Figure 8:
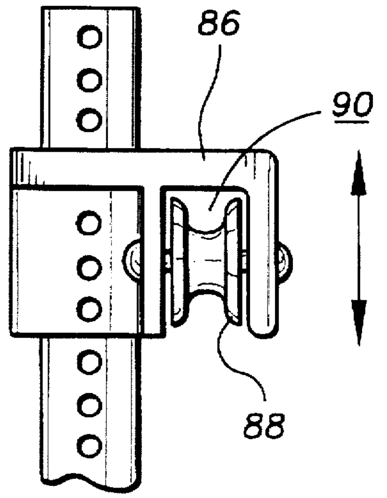
FIG. 8 is a front side plan view of the slidably positionable line guide assembly slidably positioned onto the top end of the upper pole showing the forward pole locking pin holes formed through the upper pole; and the tubular slide portion, the U-shaped pulley housing, the rotatably mounted pulley, and the two forward assembly locking pin holes.

Referring to FIG. 6, in this embodiment, slidably positionable line guide assembly 16 is slidably positioned over the top end 82 of upper pole 24. Guide assembly 16 includes a tubular shaped slide portion 84, a U-shaped pulley housing 86, a rotatably mounted pulley 88, and two assembly locking pins 90. A number of forward pole locking pin holes 92 and, with reference now to FIG. 7, a number of rear pole locking pin holes 94 are formed through upper pole 24. Each forward pole locking pin hole 92 (FIG. 6) is concentrically aligned with a companionate rear pole locking pin hole 94. With reference to FIG. 8, U-shaped pulley housing 86 and rotatably mounted pulley 88 define a line guide aperture 90 through which, with reference now to FIG. 1, the flexible hoisting line 92 of hoisting line assembly 18 is threaded. In this embodiment, the free end 94 of hoisting line 92 is fitted with an optional steel, J-shaped attachment hook 96. The other end (not shown) of hoisting line 92 is wrapped around take up reel 70 of winch assembly 20. In this embodiment, hoisting line 92 is a length of nylon coated, steel aircraft cable.

With general reference to FIGS. 1–8, hoisting system 10 is used by adjusting the height of upper pole 24 as previously described. Positioning slidably positionable line guide assembly 16 at the maximum desired lifting height as previously describe. J-shaped attachment hook 96 is then used to secure hoisting line 92 to the construction item to be hoisted and left and right handles 74,76 are then rotated by one or more workers. Rotating left and right handles 74,76 winds hoisting line 92 onto take up reel 70 and lifts the construction item to the desired height. If desired, adjustable leveling supports 38 can be adjusted to provided added stability to hoisting system 10 when lifting large items. Leveling supports 38 are adjusted by inserting a conventional slot drive screw driver into slotted screw head 66 and turning threaded adjustment screw 64 in the required direction to adjust support skid 68 to the desired height.

It can be seen from the preceding description that a portable hoisting system has been provided that is operable by as few as one worker at a construction site; that is moveable while a construction item is being support at an elevated height; that is transportable in the bed of a pickup truck; and that includes a base assembly, a telescoping pole assembly carried on the base assembly, a slidably positionable line guide assembly slidably mounted to the telescoping pole assembly, a hoisting line assembly having a hoisting line threaded through a guiding aperture of the line guide assembly, and a ratcheting winch assembly mounted onto the telescoping pole assembly and including a take up reel upon which a length of the hoisting line is wound; the base assembly including a base plate, four radiating legs extending from the base plate, and four swivel mounted rollers mounted to an underside surface of the base plate, each radiating leg including a user adjustable leveling support; the telescoping pole assembly including a lower pole rigidly mounted to an upper side surface of the base plate and an upper pole telescopically positionable with respect to the lower pole, the upper pole being lockable in a fixed position with respect to the lower pole with at least one pole locking pin assembly; the slidably positionable line guide assembly including a tubular slide portion slidably positionable over the end of the upper pole, a U-shaped pulley housing rigidly secured to the tubular slide portion, a line guide including a pulley rotatably mounted within the U-shaped pulley housing, and at least one line guide locking pin, the tubular slide portion having a rear assembly locking pin hole and a forward assembly locking pin hole formed through the sidewalls thereof, the line guide locking pin being sized in a manner to be insertable through the rear assembly locking pin hole, the forward assembly locking pin hole and a pair of the number of concentrically aligned forward and rear pole locking pin holes; the ratcheting winch assembly including an elongated handle section attached to the take up reel and of a length sufficient to extend past the side edge of the lower pole of the telescoping pole assembly.

It is noted that the embodiment of the portable hoisting system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A portable hoisting system comprising:

a base assembly;

a telescoping pole assembly carried on said base assembly;

a slidably positionable line guide assembly slidably mounted to said telescoping pole assembly;

a hoisting line assembly having a hoisting line threaded through a guiding aperture of said line guide assembly; and a winch assembly mounted onto said telescoping pole assembly and including a take up reel upon which a length of said hoisting line is wound;

said base assembly including a base plate, four legs, each leg being coextensive along a different side of the base plate and extending from said base plate, and four swivel mounted rollers mounted to an underside surface of said base plate, each leg including a user adjustable leveling support;

said telescoping pole assembly including a lower pole rigidly mounted to an upper side surface of said base plate and an upper pole telescopically positionable with respect to said lower pole, said upper pole being lockable in a fixed position with respect to said lower pole with at least one pole locking pin assembly;

said slidably positionable line guide assembly including a tubular slide portion slidably positionable over an end of said upper pole, a U-shaped pulley housing rigidly secured to said tubular slide portion, a line guide including a pulley rotatably mounted within said U-shaped pulley housing, and at least one line guide assembly locking pin, said tubular slide portion having a rear assembly locking pin hole and a forward assembly locking pin hole formed through said sidewalls thereof, said line guide assembly locking pin being sized in a manner to be insertable through said rear assembly locking pin hole, said forward assembly locking pin hole and a pair of said number of concentrically aligned forward and rear pole locking pin holes;

said ratcheting winch assembly including an elongated handle section attached to said take up reel and of a length sufficient to extend past said side edge of said lower pole of said telescoping pole assembly.

* * * * *